United States Patent
Eguchi (10) Patent No.: US 6,364,489 B1
(45) Date of Patent: *Apr. 2, 2002

(54) IMAGE PROJECTION APPARATUS

(75) Inventor: Masaharu Eguchi, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,246

(22) Filed: Jul. 22, 1999

(30) Foreign Application Priority Data

Jul. 27, 1998 (JP) .......................... 10-227583

(51) Int. Cl.$^7$ .............................................. G03B 21/00
(52) U.S. Cl. ........................................ 353/57; 353/122
(58) Field of Search ........................... 353/119, 22, 23, 353/69, 95, 57, 58, 60, 61; 349/58

(56) References Cited

U.S. PATENT DOCUMENTS

| | | | | |
|---|---|---|---|---|
| 5,743,611 A | * | 4/1998 | Yamaguchi et al. | ........... 353/31 |
| 5,842,761 A | * | 12/1998 | Futakami et al. | ........... 353/119 |
| 6,007,205 A | * | 12/1999 | Fujimori | ...................... 353/57 |

* cited by examiner

Primary Examiner—William Dowling
(74) Attorney, Agent, or Firm—Morgan & Finnegan, L.L.P.

(57) ABSTRACT

Disclosed is an image projection apparatus including a display device which has a plurality of pixel apertures and displays image information, an illumination optical unit for illuminating the display device, a projection optical unit for projecting the image information displayed on the display device on a predetermined surface, and a blower for blowing air to the atmosphere in the display device. Dust affecting a projected image is prevented from attaching near the display device.

18 Claims, 4 Drawing Sheets

IMAGE PROJECTION APPARATUS

BACKGROUND OF THE INVENTION

1. Field of the Invention

The present invention relates to an image projection apparatus and, more particularly, to an image projection apparatus using a transmission or reflection image modulation means such as a liquid crystal element.

2. Related Background Art

As a conventional image projection apparatus, one which projects an image using a liquid crystal element or DMD element as a light-transmission or light-reflection image modulation means is presently available.

A recent data grade projector, which is connected to a PC for use, has a larger number of display pixels for VGA (640×480), SVGA (800×600), XGA (1,024×768), and SXGA (1,280×1,024). To the contrary, there is a tendency to reduce the element chip size from 1.3" to 0.9" or 0.7". Therefore, the pixels of the image modulation means are laid out at a higher density and a smaller pitch.

Also, a so-called AV grade (for TV) image projection apparatus requires a larger number of display pixels in order to cope with EDTV and HDTV, and the image modulation means is decreasing in pitch.

In general, the light valve unit of the image modulation means has an external surface at a position offset by a light-transmitting member such as a cover glass or a substrate constituting the element itself. Upon image projection, dust attaching to the external surface forms a shadow defocused by the offset amount on the image to degrade the image quality.

Assuming that the image projection size and element size are constant, an increase in the number of pixels increases the relative ratio of dust to the pixel size, and dust of the same size affects a larger number of pixels.

Assuming that the image projection size and the number of pixels are constant, reduction of the element size increases the projection magnification, and the dust size also relatively increases by the magnification increase. Thus, the relative ratio of dust to the pixel size increases, and dust of the same size affects a larger number of pixels. That is, even smaller dust must be removed, which requires high internal cleanness of the apparatus.

Along with efforts to reduce the element size, efforts to improve the brightness of the image projection apparatus are also being made. However, these efforts result in an increase in the luminous flux surface density on the light valve area.

As a result, the element performance and service life are readily affected by optical energy converted into heat that is not effectively used for illumination owing to absorption by non-aperture (non-transmitting and non-reflecting) portions such as the driving circuit and mask layer of the element, and unavoidable absorption by optical element transmission layers as their transmittance is not 100% (e.g., a transparent electrode, a glass itself, and a polarizing plate which may serve as an indirect heat source because it is arranged near the element).

To prevent the adverse influence of ineffective illumination light, the image modulation means is air-cooled by wind blown from an electric fan. At this time, in order to reduce dust attaching to the external surface exposed to the illumination optical path of the image modulation means, an air filter is generally inserted in the wind path of the fan to maintain the internal cleanness of the apparatus.

Japanese Laid-Open Utility Model Application No. 6-002337 (liquid crystal cooler for liquid crystal projector) discloses a technique of incorporating no air filter but a liquid crystal light valve and convection fan in a closed box in which an optical path is ensured, transmitting heat to a convection medium while blocking dust, and externally dissipating heat of the medium by a cooling unit made up of a heat dissipation fan and electronic cooling (Peltier) element.

As described above, when the image modulation means of the image projection apparatus is air-cooled while reducing the pixel size, the apparatus must adopt a dustproof means for removing dust larger than a predetermined size without increasing the inlet/outlet resistance.

However, no prior art disclose an air filter optimization method or a setting method about the pixel size and air filter mesh pitch/absolute aperture size, which can be widely applied to products in this field, though the optical arrangement, the screen area size of the light valve, and the like are different between apparatuses.

For this reason, in developing an image projection apparatus using new optical components including a light valve, an image is actually projected by a sample apparatus to allow dust to attach, and filters are exchanged at various intervals while checking the image quality. However, the reliability of such test results and the working efficiency in these tests are low.

Further, the absolute aperture size must be "a minimum necessary size". A filter having an undesirably small aperture size or a filter having many apertures smaller than the necessary aperture size exhibits a light wind resistance, so the filter area must be unpreferably increased. This poses problems on the internal space distribution and cost of the apparatus.

Sealing the image modulation means in a box, like another prior art, seems to be an adequate dustproof measure theoretically. However, this arrangement requires driving power for the internal fan and electronic cooling element (power larger than generation energy of heat to be dissipated for cooling efficiency is consumed for medium cooling) while transferring heat from the inside to outside of the box. To dissipate heat outside the closed box, an apparatus means and power equivalent to direct air-cooling are required, resulting in low efficiency and high cost. Also, the box cannot be made of a general resin material having low thermal conductivity and low cost, so the box also increases the cost. Hence, this technique cannot be applied to a consumer product which receives power from a general power supply.

The objective of use of a closed box in the apparatus is to increase the defocusing distance of the dust-attaching surface by a medium free from any dust. However, dust still attaches to the incident/exit surface of a light-transmitting member forming an optical path in the box. General small dust hardly influences an image, but large dust such as cotton dust may influence an image. In general, evaluation of a degraded image portion (a defocused image by a dust shadow) on the screen at the same area ratio varies depending on the image definition. The defocused state changes in accordance with the angular apertures of the illumination and projection systems. That is, the defocused degree/state and a necessary dustproof level are important. The apparatus using a closed box has a box size (defocusing amount) at which small dust that cannot be removed by a general low-cost filter is not present, i.e., it has an optimum minimum size. The box and apparatus must be downsized in consideration of this optimum minimum size. However, no prior art considers this.

SUMMARY OF THE INVENTION

It is an object of the present invention to provide an image projection apparatus capable of quickly and precisely selecting a dustproof mechanism necessary for an image projection apparatus in which an image modulation means is air-cooled without sealing it in a box.

According to the present invention, there is provided an image projection apparatus capable of quantifying the relative relationship between, as variables, at least the size of an optical arrangement including the image modulation means, an effective F-number (the effective illumination angle of an illumination system/NA) including the F-number of a projection lens, the pixel pitch, the thickness of a liquid crystal glass, the refractive index of the glass, and the dust size, and optimizing with high efficiency a dust removal means widely applicable to products in this field.

It is still another object of the present invention to provide an image projection apparatus capable of avoiding an unwanted cost increase of an air filter and an undesirable load on a cooling system which are applied to products in this field, and improving the reliability and image quality of products in this field without increasing the apparatus size.

To achieve the above object, according to the present invention, there is provided an image projection apparatus comprising a display device which has a plurality of pixel apertures and displays image information, an illumination optical unit for illuminating the display device, a projection optical unit for projecting the image information displayed on the display device onto a predetermined surface, and a blower for blowing air to an atmosphere in the display device, wherein letting 2A be a pixel aperture width of the display device, α be an effective illumination angle of a projection optical system including the illumination optical unit and a projection optical unit in a medium defining a dust-attaching surface of the display device, t be a thickness of the medium defining the dust-attaching surface, and 2δ be a dust diameter, a dustproof filter for preventing passage of dust having a size given by $$\delta \geq \sqrt{\{D \cdot (A + t \cdot \tan \alpha)^2\}} \text{ (for } 0.03 < D < 0.3\text{)} \quad (1)$$

is arranged on an inlet side of the blower.

In addition, according to the present invention, there is provided an image projection apparatus comprising at least one image display device, illumination means for illuminating the image display device, projection optical means for projecting an image displayed on the image display device, cooling means for cooling the image display device, and filtering means which has apertures for filtering air discharged by the cooling means to the image display device, and preventing entrance of dust having such a size as to generate a small region or black spot having a color discontinuous and different from a neighboring color on an image projected on a virtual screen.

The above and other objects, features, and advantages of the present invention will be apparent from the following description in conjunction with the accompanying drawings.

DETAILED DESCRIPTION OF THE PREFERRED EMBODIMENTS

Figure 1:
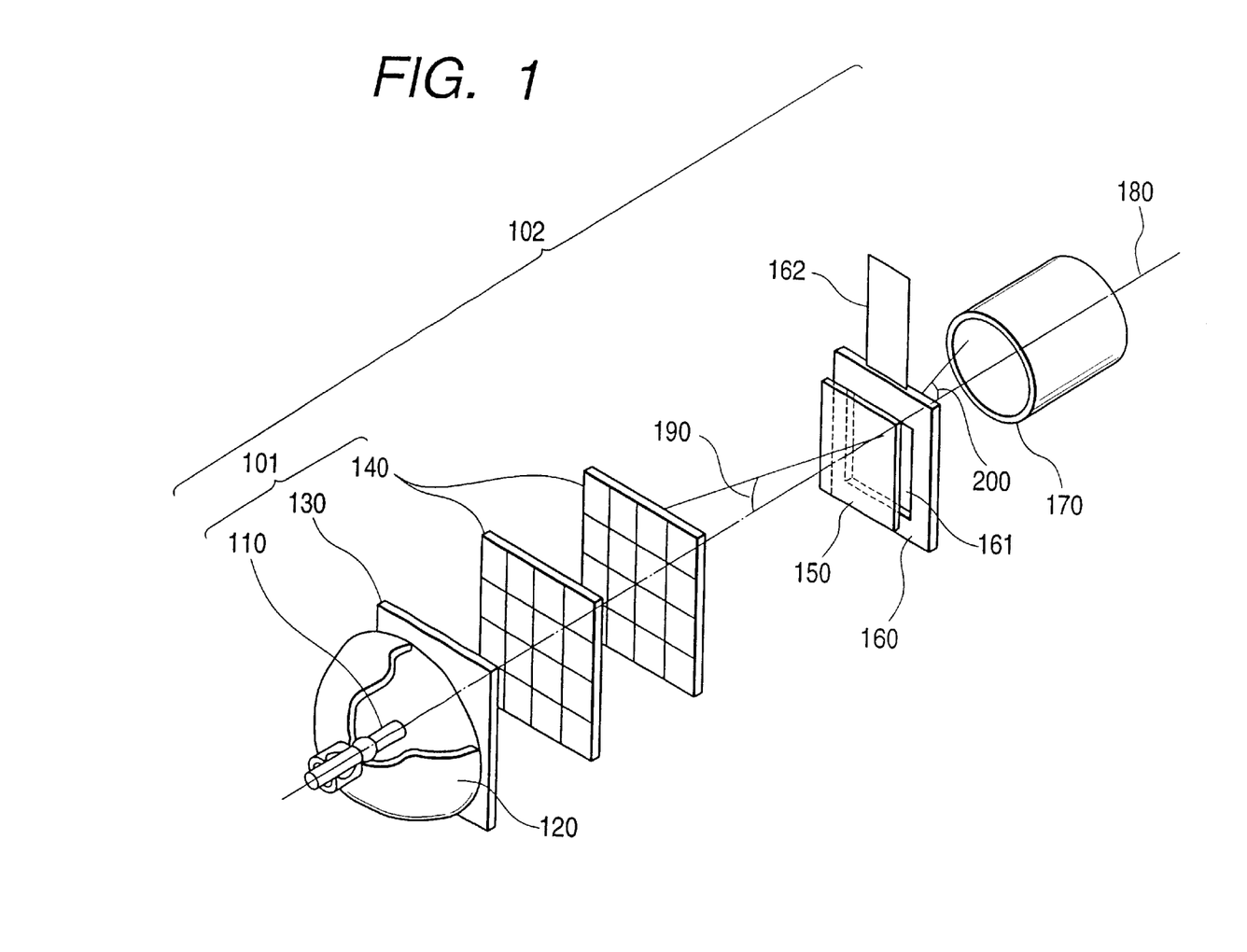
FIG. 1 is a schematic perspective view showing an image projection apparatus according to the present invention.

FIG. 1 is a schematic perspective view showing an image projection apparatus according to the first embodiment of the present invention. FIG. 1 shows the arrangement of the main components of an illumination system, image modulation means, and projection optical system.

This image projection apparatus comprises a projection optical system (projection system) 102, a light source lamp 110, a parabolic reflecting mirror 120, an IR-UV cut (cold) filter 130, an integrator 140 made of up two fly-eye lenses, an incident side polarizing plate 150, a liquid crystal light valve unit (image modulation means) 160 on which an image is formed, a light-transmitting portion 161 of the light valve, a flexible printed board 162, a projection lens 170, and an optical axis 180. The components 110, 120, 130, and 140 constitute part of an illumination optical system (illumination system) 101. Reference numeral 190 denotes an angular aperture of the illumination optical system 101, and reference numeral 200 denotes an angular aperture of the projection optical system (projection system). The illumination system 101 and projection lens 170 form part of the projection optical system 102.

In FIG. 1, a beam from the light source 110 is collimated by the parabolic reflecting mirror 120, and unnecessary light components other than a visible beam are removed by the IR-UV cut filter 130. The illumination intensity is made uniform by the integrator 140 of a known fly-eye type. The beam passes through the polarizing plate 150 to illuminate the light-transmitting portion 161 of the liquid crystal light valve unit 160 with a margin of about 10% the area ratio. The illumination beam is modulated by the liquid crystal light valve to form an image on a projection surface (not shown) by the projection lens 170.

In FIG. 1, the image projection apparatus uses the projection lens 170 having an angular aperture which coincides with the exit angle (equal to the incident angle when both incident and exit media are air and the valve does not incorporate any lens) of a beam which illuminates and passes through the light valve 160 at the angular aperture 190 of the illumination optical system (110, 130, and 140). This image projection apparatus uniformly projects an effective image formation beam by a projection lens having a minimum necessary F-number.

Figure 2:
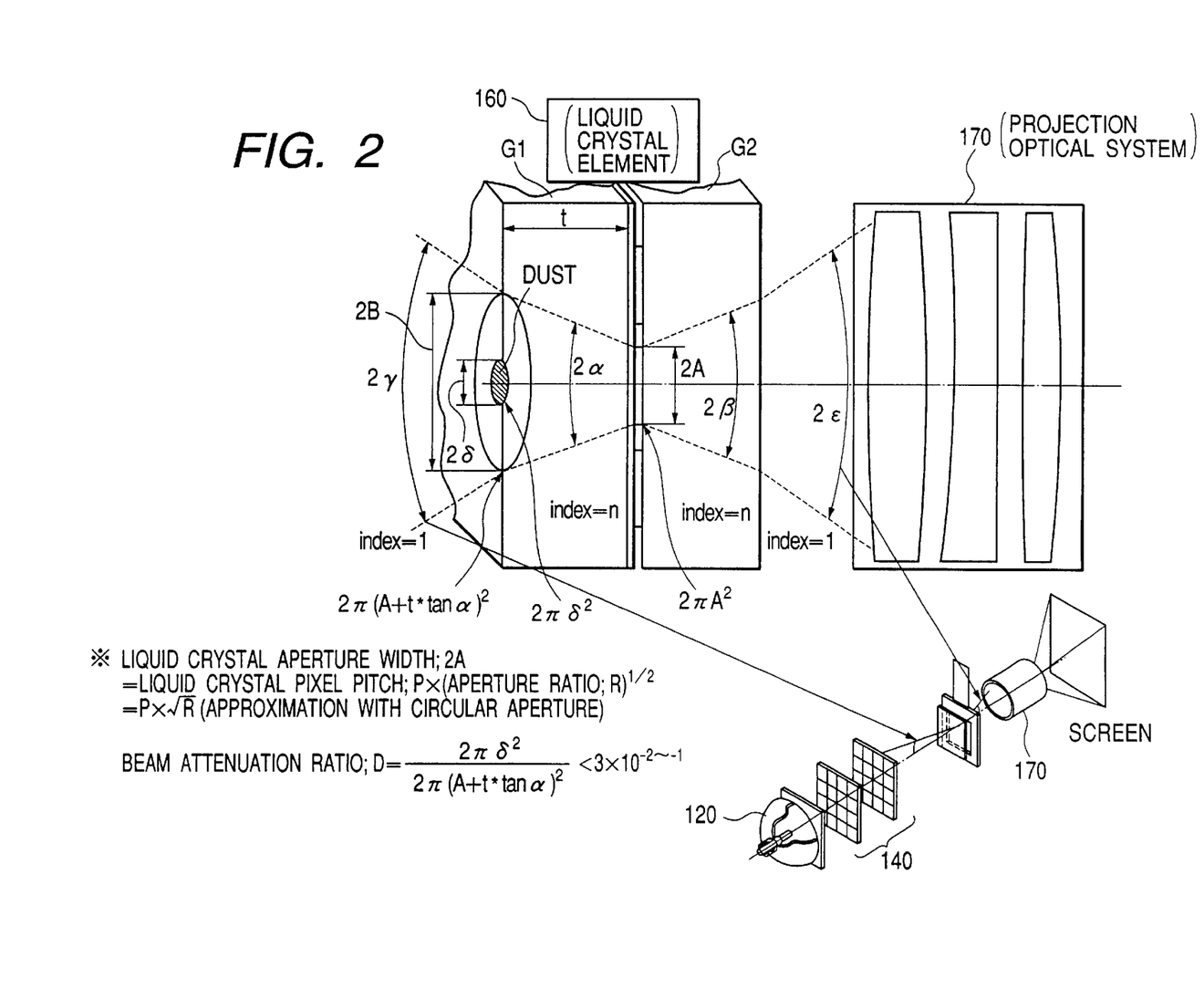
FIG. 2 is a sectional view showing a liquid crystal element in FIG. 1.

FIG. 2 is an enlarged sectional view showing, in correspondence with FIG. 1, the liquid crystal element of the liquid crystal light valve unit 160 used in the optical system of FIG. 1. The reference symbols denote the following components.

TABLE 1

Reference Symbol Table

| Symbol | Item |
|---|---|
| F | Effective F-number of projection optical system |
| α | Angular aperture of illumination system in glass |
| β | Angular aperture of projection system in glass |
| γ | Angular aperture of illumination system |
| ε | Angular aperture of projection system |

TABLE 1-continued

Reference Symbol Table

| Symbol | Item |
| --- | --- |
| n | Refractive index of liquid crystal glass |
| t | Thickness of liquid crystal glass |
| P | Liquid crystal pixel pitch |
| R | Liquid crystal aperture ratio |
| A | Liquid crystal aperture radius (converted into circle) |
| δ | Dust radius (converted into circle) |
| $2\pi\delta^2$ | Dust area |
| $2\pi(A + t\cdot\tan\alpha)^2$ | Incident area of pixel illumination beam |
| D | Beam attenuation ratio (due to dust) |

Letting F be the effective F-number of the projection optical system, ε be the angular aperture, and γ be the angular aperture of the illumination system 101, an unnecessarily brighter projection system than the illumination system is disadvantageous in the lens performance, weight/size, and cost. For this reason, the angular aperture of the projection optical system is set to be equal to that of the illumination system or the F-number of the projection optical system is set to regulate the effective beam by the F-number of the projection lens with a margin on the illumination side. In this case, the two angular apertures are set to ε=γ.

The liquid crystal element 160 sandwiches liquid crystals between two glass plates (liquid crystal glass plates) G1 and G2 each having a thickness t and refractive index n. The influence of dust with a radius δ attaching to a glass surface on a projection beam is quantified, and the specification of a necessary dustproof means is set.

An illumination beam is incident on the dust-attaching position at an angle γ or less, refracted by the liquid crystal glass G1, and reaches the liquid crystal aperture at an angle α or less. Of the beam transmitted through the aperture, a beam having an angle β or less inside the liquid crystal glass G2 in correspondence with the angular aperture ε of the projection lens 170 is an effective image formation beam for forming an image.

Since the angular aperture of the illumination optical system is ε=γ, from the Snell's law we have $$\sin\gamma = n\cdot\sin\alpha, \quad \sin\epsilon = n\cdot\sin\beta \tag{1}$$

Since the angular aperture of the illumination system in the glasses G1 and G2 is α=β, $$\alpha = \beta = \arcsin\{(1/n)\cdot\sin\epsilon\} \tag{2}$$

Accordingly, the effective F-number F and angular aperture ε of the projection optical system 170 are defined by $$\tan\epsilon = 1/(2\cdot F) \tag{3}$$

Assuming that the intensity distribution of an illumination beam at the incident angle on the dust-attaching surface is almost constant, the influence of dust on the projection beam quantity is defined as the ratio (to be referred to as a beam attenuation ratio; D) of the dust area to the incident area of a pixel illumination beam in Table 1.

The shapes of dust and light valve aperture (effective light valve area) are respectively converted into circles, and their radii upon conversion are represented by δ and A. Then, the dust area is $2\pi\delta^2$, and the incident area of the illumination beam to the light valve aperture on the dust-attaching surface is $2\pi(A+t\cdot\tan\alpha)^2$ from the above angular aperture.

The beam attenuation ratio D is given by $$\text{Beam Attenuation Ratio } D = \frac{2\pi\delta^2}{2\pi(A + t\cdot\tan\alpha)^2} \tag{4}$$

This quantification equation is an equation on the optical axis without considering any nonuniform component arising from the image height such as the cosine law for a large image height. Dust most stands out at the screen center (i.e. on the optical axis), so that quantification under these conditions is rational.

The allowable level of dust influence on the image changes depending on each user. However, most of evaluators recognize dust with a size determined by the beam attenuation ratio D=0.03 to 0.3 (allowable limit).

In general, a shadow formed in uniform bright color on a still image and particularly a CG image and positioned in the center thereof most stands out. For a moving image, the allowance is 10 times or more. Considering this in addition to an intended product use and grade, the allowable limit of D is set within the range of D.

CALCULATION EXAMPLE

Assume that the effective F-number of the projection/illumination system is F=2.5, the pixel pitch is P=25 μm (square layout), the pixel aperture ratio (the effective area ratio of the light valve) is R=0.55, the thickness of the liquid crystal glass is t=1,200 μm, and the refractive index of the liquid crystal glass is n=1.5.

Letting P be the pixel pitch, and R be the liquid crystal aperture ratio, the liquid crystal aperture radius A is given by $$A = (1/2)\cdot P\cdot\sqrt{R} \tag{5}$$

Thus, $$A \approx 9.27 \mu m \tag{6}$$

Solving beam attenuation ratio equation (4) for δ yields:

$$\delta = \sqrt{\{D\cdot(A+t\cdot\tan\alpha)^2\}} \tag{7}$$

The beam attenuation ratio is set from D=0.03 to 0.3 to D=0.1, and tan ε=1/(2·F)=0.2. From equations (2) and (3), $$\alpha = \arcsin\{(1/n)\cdot\sin\epsilon\} \tag{2}$$

$$\delta \approx 53 \mu m \tag{8}$$

As a result, degradation of the image quality caused by dust with a dust diameter 2δ≈0.1 mm is estimated to be an allowable limit for most of evaluators (users). An equal-pitch mesh-like filter (square mesh, metal wire diameter of 0.02, and P=0.1) having a mesh aperture size of about 2δ is employed because of high heat resistance, high aperture size stability, and high aperture ratio.

If a coarse low-cost filter is used with large δ, the glass thickness t is set large. A large thickness t is preferable if no problem arises on the mass production of light valves in terms of the heat capacity, transmittance, and the like. To suppress cost, the cost of the dustproof means and the cost of the glass must be balanced.

By setting the respective components in this manner, the first embodiment can achieve the following effects.

(1) The dustproof means necessary to remove dust larger than the limit size that may degrade the image quality can be optimized in accordance with an optical specification.

(2) The absolute aperture size can be optimized, and a mesh-like filter with high aperture uniformity can be used to reduce the wind resistance on the cooling wind path.

(3) For a filter with a minute aperture, larger dust can be removed in the preceding step.

An example of a 3-panel type liquid crystal front projector using the above filter as a dustproof means will be described.

Figure 3A:
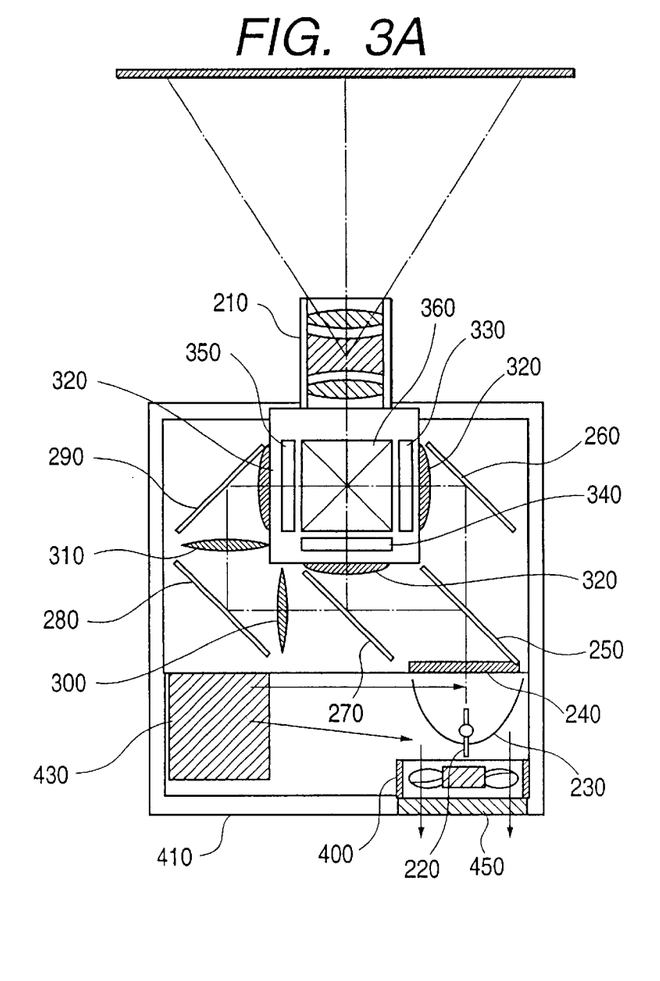
FIGS. 3A and 3B are a plan view and a side view, respectively, showing the arrangement of the main part of a projector according to the first embodiment of the present invention.
Figure 3B:
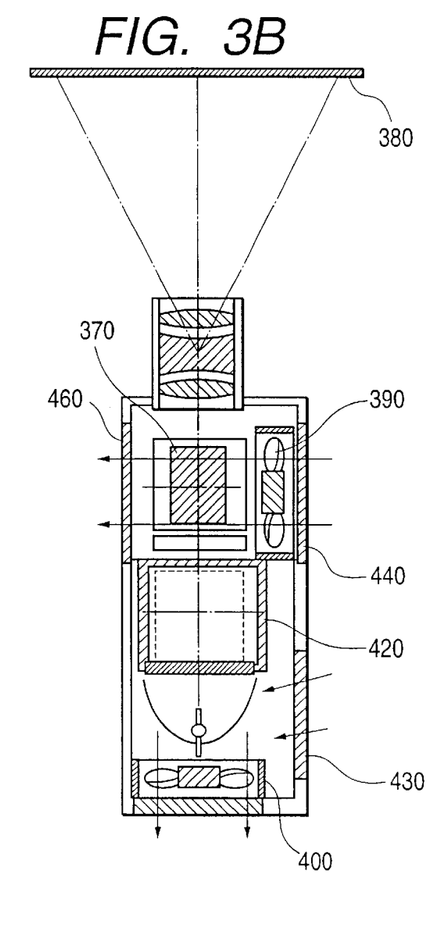

FIGS. 3A and 3B are a plan view and a side view, respectively, showing the arrangement of the main part of the projector according to the first embodiment.

In FIGS. 3A and 3B, the projector comprises a projection lens 210, a light source lamp 220, a parabolic reflecting mirror 230, an IR-UV cut filter 240, a dichroic mirror 250, a total reflection mirror 260, a dichroic mirror 270, total reflection mirrors 280 and 290, a condenser lens 300, a relay lens 310, field lenses 320, transmission liquid crystal panel units 330, 340, and 350, a cross dichroic prism 360, a light-transmitting surface (FIG. 3B) 370 of the liquid crystal panel, a projection screen 380, fans 390 and 400, a projector housing 410, an illumination system color separation unit 420, and air filters 430, 440, 450, and 460. This projector adopts a known optical arrangement recently available from many companies.

In this arrangement, a beam from the light source lamp 220 is reflected into an almost parallel beam by the parabolic reflecting mirror 230, and unnecessary light components other than a visible beam are removed by the IR-UV cut filter 240. After the first color separation by the dichroic mirror 250, the transmitted beam is reflected by the total reflection mirror 260 to bend the optical path of the beam passing through the dichroic mirror 250 by 90°. The light reflected by the total reflection mirror is separated into three, R, G, and B primary colors by the second color separation by the dichroic mirror 270. The order of color separation is not related to the present invention and is arbitrary.

To eliminate the difference in optical path length, only the beam having passed through the dichroic mirror 270 passes through an optical path extending through the condenser lens 300 and relay lens 310 after color separation, and the optical path is bent by 180° by the total reflection mirrors 280 and 290.

The separated beams pass through the field lens 320 to illuminate the transmission liquid crystal panel units 330, 340, and 350.

Although the integrator lens 140 in FIG. 1 is not illustrated, it can be easily inserted in the arrangement of FIGS. 3A and 3B by properly increasing the interval on the optical path between the first color separation dichroic mirror 250 and IR-UV cut filter 240 that serves as a parallel illumination beam path. In this case, a known polarizing conversion element may be added to increase the beam quantity. The illumination beam angle corresponding to the angular aperture of the illumination system according to the present invention can be easily obtained by those skilled in the art by tracing a beam based on the arc length of the light source lamp.

After the transmitted beam quantities are modulated by the liquid crystal light valves (image modulation means) 330, 340, and 350, the panel illumination beams are synthesized by the known color synthesis cross dichroic prism 360, and projected on the projection screen 380 by the projection lens 210 to form an image.

Entrance of dust into the unit 420 is prevented by a closed box using the IR-UV cut filter 240 and field lenses 320 serving as beam-transmitting portions of the color separation unit 420, as beam-transmitting lids for the incident and exit planes of the optical path. Heat generated in this unit is very small compared to the internal capacity and box surface area, and no thermal problem occurs in the closed box.

The unit 420 is sealed to prevent a decrease in transmittance caused by gas contamination and a decrease in brightness of the projector over time in the unit having many optical surfaces which transmit beams.

The interior of the projector housing 410 is air-cooled by two fans. Heat generated by the lamp and a power supply system (not shown) is dissipated by cooling using an air flow which is taken in via the air filter 430 attached to an inlet port formed in the housing 410, and is discharged via the fan 400. The fan 400 also dissipates heat radiated from the external surface of the illumination system color separation unit 420.

The air filter 450 is attached to an outlet port to prevent entrance of dust in an idle state. The influence of dust on an image in the lamp system is generally negligible, and the air filter of the lamp system may be omitted or replaced by a slit in the housing or the like so far as the transmission liquid crystal panel units 330, 340, and 350 are substantially separated from internal components (e.g., an electric circuit board; not shown). In this way, the interior of the light source housing including the light source 220 is air-cooled.

The transmission liquid crystal panel units 330, 340, and 350 most relating to the present invention are air-cooled by the dedicated fan 390 against heat generated by the polarizing plate with a low aperture ratio. The panel section including the transmission liquid crystal panel units 330, 340, and 350 forms a closed space by the housing 410, illumination system color separation unit 420, fan 390, and coupling member (not shown) except for the inlet and outlet ports. Heat is dissipated outside the projector housing 410 by taking in the air by the fan 390 via the air filter 440 at the inlet port, and discharging the air via the air filter 460. The interior of the panel housing including the panel is air-cooled by the fan 390.

In this case, the air filter 440 at the inlet port and the air filter 460 at the outlet port are made of the above-described mesh-like filter.

The air filter of the panel may be coarser and simpler than the filter on the outlet side by extending the outlet (discharge) path to the lower surface of the projector, or blowing wind in opposite directions to FIGS. 3A and 3B showing upper-surface inlet and lower-surface outlet to prevent entrance of dust from the outlet side in an idle state.

Figure 4A:
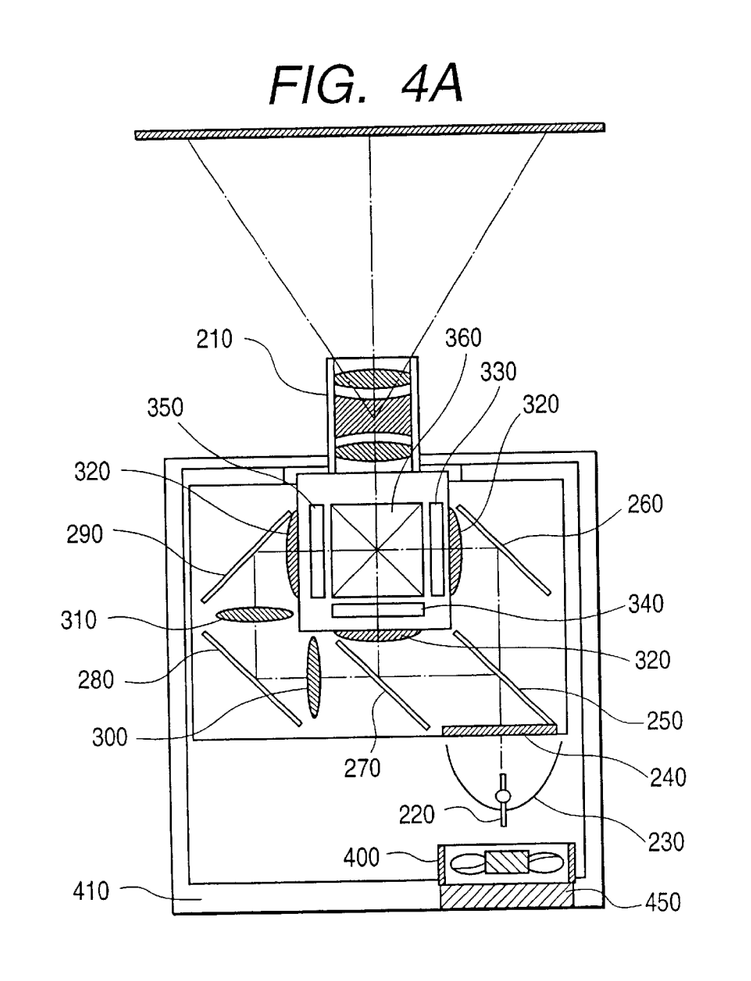
FIGS. 4A and 4B are a plan view and a side view, respectively, showing the arrangement of the main part of a projector according to the second embodiment of the present invention.
Figure 4B:
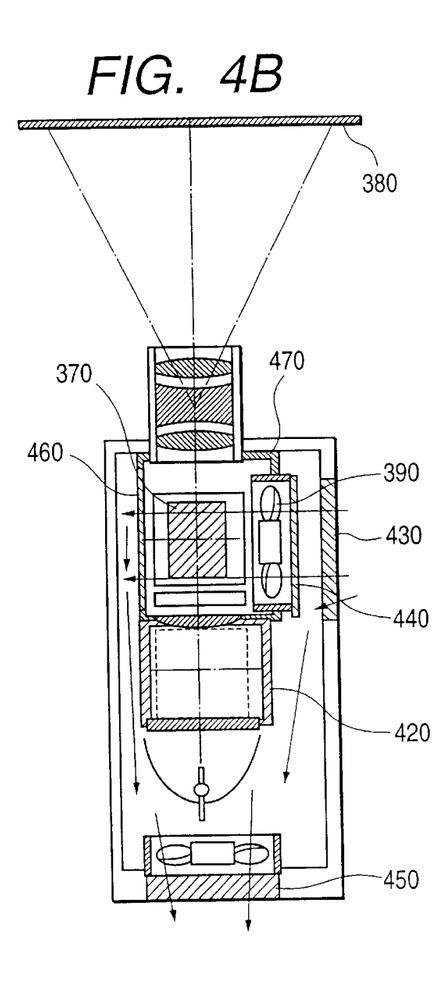

FIGS. 4A and 4B are a plan view and a side view, respectively, showing the arrangement of the main part of a projector according to the second embodiment of the present invention.

The second embodiment has the same optical arrangement as the first embodiment shown in FIGS. 3A and 3B, and only a difference will be explained. FIGS. 4A and 4B show a modification of the cooling system arrangement.

The second embodiment is different from the first embodiment in FIGS. 3A and 3B by employing a double-box structure in which the panel section-enclosing structure including inlet and outlet ports is independent inside the projector housing, and attaching filters to the inlet and outlet ports of the respective boxes (a panel section-enclosing box 470 and housing 410).

The same reference numerals as in the first embodiment denote the same fans and filters. The panel-enclosing box 470 forms a closed space except for the inlet and outlet ports. Heat is temporarily dissipated to the projector housing 410 by taking in the air by a fan 390 via an air filter 440 at the inlet port, and discharging the air via an air filter 460. After that, the heat is dissipated by suction of an air flow generated by a fan 400 via an air filter 430 attached to the inlet port formed in the housing 410 together with heat radiated from the external surface of an illumination system color separation unit 420 and heat generated by the lamp and a power supply system (not shown). The fan 400 also serves to dissipate heat radiated from the external surface of the illumination system color separation unit 420.

As described above, the panel section is cooled by an air flow flowing from outside the housing 410→the air filter 430→the air filter 440→the panel section→the air filter 460→the air filter 450→outside the housing.

The pitches of the air filters 430 and 450 suffice to be coarse. The air filters 440 and 460 are made of the above-described mesh-like filter.

The two embodiments have exemplified a general transmission 3-panel type liquid crystal projector using a cross dichroic prism as a light combiner. However, the technique used in the present invention is not limited to this.

Modifications of the arrangement obvious to those skilled in the art are as follows.

A known L-shaped dichroic prism is used for the color combining (synthesis) system instead of the cross dichroic prism, and three panels are laid out in not a U shape but Z shape.

A known sequential-mirror type dichroic mirror is used for the color combining system instead of the cross dichroic prism, and three panels are laid out in not a U shape but Z shape.

An L-shaped dichroic prism is made up of pluralities of separate dichroic prisms and mirrors.

A reflection liquid crystal valve is used as the liquid crystal light valve.

In this case, the above equations can be applied to an example using the same glass thickness, refractive index, and the like on the incident and exit sides if the mirror image relationship on the light valve surface is developed. These equations can also be directly applied to even an oblique incident/exit beam as long as dust is approximated to a thickness of 0 (zero) with respect to the dust-attaching surface. Since dust is approximated to a circle by the projection area ratio, $\cos \kappa$ ($\kappa$=the inclination of the oblique incident/exit beam) is multiplied by the denominator of equation (4) of the beam attenuation ratio D.

Also when a DMD element used for the light valve, a beam is incident obliquely. The element aperture ratio is the same as in the transmission liquid crystal by using an effective mirror surface area ratio from which the areas of the element driver and mechanical link structure are excluded.

The light valve may be of a single-plate type, i.e., liquid crystal type with a color filter in which white light is irradiated without any color separation.

The present invention can be applied to an apparatus using a liquid crystal panel with a microlens.

Also in this case, the area ratio at the boundary between the glass as a surface to which a dust will be attached and the air plane is important. D is calculated by mechanically obtaining the refraction state in the plane defining the external surface of the panel by beam tracing, CAD image formation, or the like. The calculated D is applied to a projector product. This is obvious to those skilled in the art and falls within the spirit and scope of the present invention.

By setting the respective components in the above way, the present invention can achieve the following effects.

The dustproof means necessary to remove dust larger than the limit size that may degrade the image quality can be optimized in accordance with an optical specification. The dustproof means can be set in more detail without outputting an image, the product development efficiency can be increased, and the product quality can be improved.

An unwanted cost increase of the air filter and an undesirable load on the cooling system can be avoided.

The service life of the product can be prolonged by preventing clogging of the small-aperture air filter.

Reliability can be improved, and the maintenance necessity can be reduced.

As a result, high reliability and high image quality of products in this field can be attained without increasing the apparatus size.

What is claimed is:

1. An image projection apparatus comprising:
   a display device which has a plurality of pixel apertures and displays image information;
   an illumination optical unit for illuminating said display device;
   a projection optical unit for projecting the image information displayed on said display device onto a predetermined surface; and
   a blower for blowing air to an atmosphere in said display device,
   wherein letting 2A be a pixel aperture width of said display device, $\alpha$ be an effective illumination angle of a projection optical system including said illumination optical unit and projection optical unit in a medium defining a dust-attaching surface of said display device, t be a thickness of the medium defining the dust-attaching surface, and 2δ be a dust diameter, a dust-proof filter for preventing passage of dust having a size given by $$\delta \geq \sqrt{\{D\cdot(A+t\cdot\tan\alpha)^2\}} \text{ (for } 0.03<D<0.3) \quad (1)$$

is arranged on an inlet side of said blower.

2. An image projection apparatus comprising:
   a display device which has a plurality of pixel apertures and displays image information;
   an illumination optical unit for illuminating said display device;
   a projection optical unit for projecting the image information displayed on said display device onto a predetermined surface; and
   a blower for blowing air to an atmosphere in said display device,
   wherein letting 2A be a pixel aperture width of said display device, $\alpha$ be an effective illumination angle of a projection optical system including said illumination optical unit and projection optical unit in a medium defining a dust-attaching surface of said display device, t be a thickness of the medium defining the dust-attaching surface, and 2δ be a dust diameter, an equal-pitch mesh-like filter for preventing passage of dust having a size given by $$\delta \geq \sqrt{\{D\cdot(A+t\cdot\tan\alpha)^2\}} \text{ (for } 0.03<D<0.3)$$

is arranged on an inlet side of said blower, and wherein said equal-pitch mesh-like filter has a mesh aperture size of 2δ.

3. An apparatus according to claim 2, wherein a second mesh-like filter having a mesh aperture size larger than 2δ is disposed outside of said mesh-like filter.

4. An apparatus according to claim 1, wherein said illumination optical unit comprises a light source, and cooling means for air-cooling an interior of a light source housing including said light source.

5. An image projection apparatus comprising:
   at least one image display device;
   illumination means for illuminating said image display device;

projection optical means for projecting an image displayed on said image display device;

cooling means for cooling said image display device; and filtering means which has apertures for filtering air discharged to said cooling means, and for selectively preventing entrance of dust having a size bigger than a predetermined size, wherein the predetermined size is defined as a ratio of an area occupied by the dust on a glass surface to an area of pixel illumination beam of the image projection apparatus.

6. An apparatus according to claim 5, comprising three image device devices.

7. The apparatus of claim 5, wherein said glass surface is a surface of said image display device.

8. The apparatus of claim 5, wherein the ratio is between 0.03 and 0.3.

9. A method of quantifying an influence of dust attached to a glass surface of an image projection apparatus comprising:

(i) defining the relationships between optical parameters of the image projection apparatus; and (ii) defining a minimum size of the dust that can be recognized by a viewer as a ratio of an area occupied by the dust on the glass surface to an area of pixel illumination beam, wherein the ratio is represented by the relationships between the optical parameters.

10. The method of claim 9, wherein the ratio is between 0.03 and 0.3.

11. The method of claim 9, wherein the optical parameters include at least one of an effective F-number, angular apertures, refractive index of liquid crystal glass, thickness of liquid crystal glass, liquid crystal pixel pitch, liquid crystal aperture ratio, liquid crystal aperture radius.

12. An apparatus according to claim 2, wherein said illumination optical unit comprises a light source, and cooling means for air-cooling an interior of a light source housing including said light source.

13. An apparatus according to claim 2, said equal-pitch mesh-like filter is made of a metal wire.

14. An image projection apparatus comprising:

a reflective liquid crystal display device which has a plurality of pixel apertures and displays image information;

an illumination optical unit for illuminating said reflective liquid crystal display device;

a projection optical unit for projecting the image information displayed on said reflective liquid crystal display device onto a predetermined surface; and a blower for blowing air to an atmosphere in said reflective liquid crystal display device, wherein letting 2A be a pixel aperture width of said reflective liquid crystal display device, $\alpha$ be an effective illumination angle of a projection optical system including said illumination optical unit and projection optical unit in a medium defining a dust-attaching surface of said reflective liquid crystal display device, t be a thickness of the medium defining the dust attaching surface, and $2\delta$ be a dust diameter, a dust-proof filter for preventing passage of dust having a size given by $$\delta \geq \sqrt{\{D \cdot (A + t \cdot \tan \alpha)^2\}} \text{ (for } 0.03 < D < 0.3\text{)}$$

is arranged on an inlet side of said blower.

15. An image projection apparatus comprising:

a reflective liquid crystal display device which has a plurality of pixel apertures and displays image information;

an illumination optical unit for illuminating said reflective liquid crystal display device;

a projection optical unit for projecting the image information displayed on said reflective liquid crystal display device onto a predetermined surface; and a blower for blowing air to an atmosphere in said reflective liquid crystal display device, wherein letting 2A be a pixel aperture width of said reflective liquid crystal display device, $\alpha$ be an effective illumination angle of a projection optical system including said illumination optical unit and projection optical unit in a medium defining a dust-attaching surface of said reflective liquid crystal display device, t be a thickness of the medium defining the dust attaching surface, and $2\delta$ be a dust diameter, an equal-pitch mesh-like filter for preventing passage of dust having a size given by $$\delta \geq \sqrt{\{D \cdot (A + t \cdot \tan \alpha)^2\}} \text{(for } 0.03 < D < 0.3\text{)}$$

is arranged on an inlet side of said blower.

16. An apparatus according to claim 15, wherein said equal-pitch mesh-like filter has a mesh aperture size of $2\delta$.

17. An apparatus according to claim 15, wherein said illumination optical unit comprises a light source, and cooling means for air-cooling an interior of a light source housing including said light source.

18. An apparatus according to claim 15, said equal-pitch mesh-like filter is made of a metal wire.

* * * * *

UNITED STATES PATENT AND TRADEMARK OFFICE
CERTIFICATE OF CORRECTION

PATENT NO.    : 6,364,489 B1
DATED         : April 2, 2002
INVENTOR(S)   : Masaharu Eguchi It is certified that error appears in the above-identified patent and that said Letters Patent is hereby corrected as shown below:

<u>Column 5,</u>
Line 13, in the Table, "$2\pi(A + t.\tan \alpha)^2$" should read -- $2\pi(A + t \bullet \tan \alpha)^2$ --

Signed and Sealed this

Tenth Day of December, 2002

JAMES E. ROGAN
*Director of the United States Patent and Trademark Office*